(12) United States Patent
Pighin et al.

(10) Patent No.: US 8,405,664 B1
(45) Date of Patent: *Mar. 26, 2013

(54) INVERSION OF POST-SKINNING FEATURES

(75) Inventors: Frederic P. Pighin, San Francisco, CA (US); Cary Phillips, Moss Beach, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/279,595

(22) Filed: Oct. 24, 2011

Related U.S. Application Data

(63) Continuation of application No. 11/848,799, filed on Aug. 31, 2007, now Pat. No. 8,044,962.

(51) Int. Cl.
*G06T 15/00* (2011.01)
(52) U.S. Cl. .......... 345/473; 345/474; 345/475; 303/10; 303/11; 303/15; 303/152; 303/186; 382/118
(58) Field of Classification Search .................. 303/186, 303/9.62, 10, 11, 15, 152; 345/473, 474, 345/475; 382/118
See application file for complete search history.

(56) References Cited

U.S. PATENT DOCUMENTS

| 6,822,653 | B2 | 11/2004 | Boyd et al. |
| 7,088,367 | B2 | 8/2006 | Boyd et al. |
| 7,755,623 | B2 | 7/2010 | Rockwood et al. |
| 7,860,280 | B2 | 12/2010 | Danowitz |
| 8,044,962 | B1 * | 10/2011 | Pighin et al. ................ 345/473 |

OTHER PUBLICATIONS

Magnenat-Thalmann et ai, Joint-dependent local deformation for hand animation and object grasping. In proceedings on graphics Interface '88, pp. 26-33, Canadian Information Processing Society 1988.
Rhee, et al. "Real-Time Weighted Pose-Space Deformation on the GPU", Eurographics 2006, vol. 25, No. 3, 10 pages.
Teran et al, Creating and Simulating Skeletal Muscle from the Visible Human Data Set, May/Jun. 2005, IEEE Transactions on Visualization and Computer Graphics, vol. 11, No. 3, pp. 317-328.
"Tutorial 7: Character Setup—Beck's Envelope," 2002 Avid Technologies, pp. 126-144.
Xian, et al. A Powell Optimization Approach for Example-Based Skinning in a Production Animation Environment, Nanyang Technological University, in CASA, 2006, pp. 1-10.

* cited by examiner

*Primary Examiner* — Phu K Nguyen
(74) *Attorney, Agent, or Firm* — Fish & Richardson P.C.

(57) ABSTRACT

A computer-implemented method includes identifying a representation of a feature of an animated character by inverting an skinned representation of the feature in one position. The inversion includes a non-linear inversion of the skinned representation of the feature. The method also includes skinning the identified feature representation to produce the animated character in another position.

20 Claims, 5 Drawing Sheets

INVERSION OF POST-SKINNING FEATURES

CLAIM OF PRIORITY

This application is a continuation application and claims priority under 35 USC §120 to U.S. patent application Ser. No. 11/848,799, filed on Aug. 31, 2007, now U.S. Pat. No. 8,044,962 the entire contents of which are hereby incorporated by reference.

TECHNICAL FIELD

This document relates to using inversion techniques for skinning characters for animation.

BACKGROUND

Numerical models may be generated by a computer to represent bones and joints that may be combined to form a skeleton of an animation character. By displacing and rotating the joints and bones, the character may be animated to illustrate various types of motion and mannerisms. Through a process known as enveloping or skinning, a deformable mesh or other similar representation is wrapped around the skeleton to provide the character with an outer layer (such as skin). By attaching the deformable mesh to the skeleton, movement of the skeleton may be transferred to the mesh and correspondingly deform the mesh to illustrate animation.

SUMMARY

The systems and techniques described here relate to using inversion techniques for skinning characters for animation.

In one aspect, a computer-implemented method includes identifying a representation of a feature of an animated character by inverting a skinned representation of the feature in one position. The inversion includes a non-linear inversion of the skinned representation of the feature. The method also includes skinning the identified feature representation to produce the animated character in another position.

Implementations may include any or all of the following features. A portion of the animated character maybe skinned with the identified feature. Inverting the skinned representation may include inverting a portion of the animated character in the second position. A linear inversion of the skinned representation of the feature may be used to initiate the non-linear inversion of the of the skinned representation of the feature. The non-linear inversions may implement a iterative technique such as the Newton-Raphson method. Inverting the skinned representation of the feature may include selecting a vertex of the feature representation. Inverting the skinned representation of the feature may include selecting a vertex of the feature representation based upon neighboring vertices. Inverting the skinned representation of the feature may include selecting a first vertex located at a boundary of the feature representation. Inverting the skinned representation of the feature may include selecting a second vertex located between the first vertex and a center location of the feature representation to provide processing in a "brushfire" fashion.

In another aspect, a system includes a skin deformer to identify a representation of a feature of an animated character by inverting a skinned representation of the feature in one position. The inversion includes a non-linear inversion of the skinned representation of the feature. The skin deformer is also configured to skin the identified feature representation to produce the animated character in another position.

In another aspect, a computer program product tangibly embodied in an information carrier and comprising instructions that when executed by a processor perform a method that include identifying a representation of a feature of an animated character by inverting an skinned representation of the feature in one position. The inversion includes a non-linear inversion of the skinned representation of the feature. The method also includes skinning the identified feature representation to produce the animated character in another position.

Details of one or more implementations are set forth in the accompanying drawings and the description below. Other features, aspects and advantages will be apparent from the description and drawings, and from the claims.

DETAILED DESCRIPTION

Figure 1:
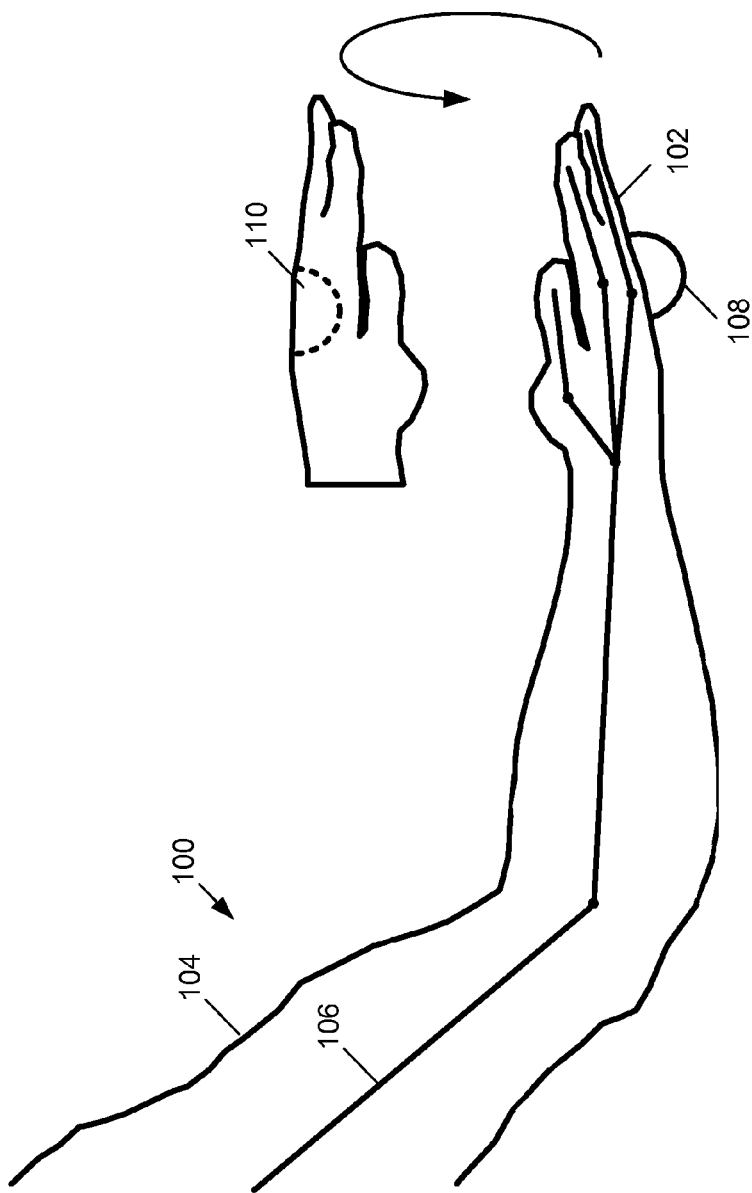
FIGS. 1 and 2 are diagrams of an animated character's arm.

Referring to FIG. 1, an arm of an animated character is shown that includes a hand that rotates about a wrist into two positions. In particular an animated arm 100 is illustrated such that a hand 102 (at one end of the arm) is oriented with its palm pointing in an upward direction. A mesh 104 covers a series of joint and bone representations that form a skeleton 106 of the arm 100. Along with representing a layer of skin, the mesh 104 may be deformed based upon the movements of the skeleton 106.

To apply the mesh 104, a enveloping or skinning process is executed that binds the skeleton 106 to one or more mesh objects that may deform as the skeleton is animated or moved. As the skeleton 106 or portions of the skeleton is moved/animated, a numerical relationship between vertices of the mesh and the skeleton causes the vertices to change position and deform the mesh 104. In some arrangements, movement of the skeleton 106 causes vertices of the mesh 104 to be "tugged" and cause a local deformation of the mesh. While skeletal movement located close to a particular vertex may heavily influence the vertex changing position, movements of the skeleton relatively distant from the vertex may also influence deformation.

Typically, when the skeleton 106 is first associated ("bound") with the mesh 104, the location of the joints and bones are used to define a reference position of the skeleton, referred to as the bind pose. The bind pose provides a static, fixed coordinate system that is used as a reference for detecting if the skeleton has been animated. By detecting and identifying movement, the differential position changes of the skeleton may be used to transform to the vertices of the mesh 104.

Along with attaching a mesh to a skeleton to provide the illusion of skin, character bodies may also include other features such as geometric features (e.g., appendages, facial blemishes, etc.) or types of shapes (e.g., lumps). For example, a performance (e.g., movie, television show, etc.) may call for an animated character has two horns attached to the character's head. In some situations, these horns may be created separately and attached to the character after a mesh has skinned the character's skeleton. Since the horns are attached after skinning, which are referred to as post-skinning features, the horns may not move consistently with the mesh that represents the character's skin. As such, movements of the horns may not appropriately follow the movements of the mesh as driven by the underlying skeleton of the character.

For illustrative purposes, a lump 108 is attached to the back of the hand 102 after the animated arm 100 has been skinned with the mesh 104. As the hand 102 is rotated such that the palm is pointing downward, the lump may not follow the movement of the mesh 104 as driven by the rotating movement of the bones and joints of the wrist and hand. As such, the lump 108 may substantially remain in an equivalent position and create a concavity 110 in the back of the hand 102.

Figure 2:
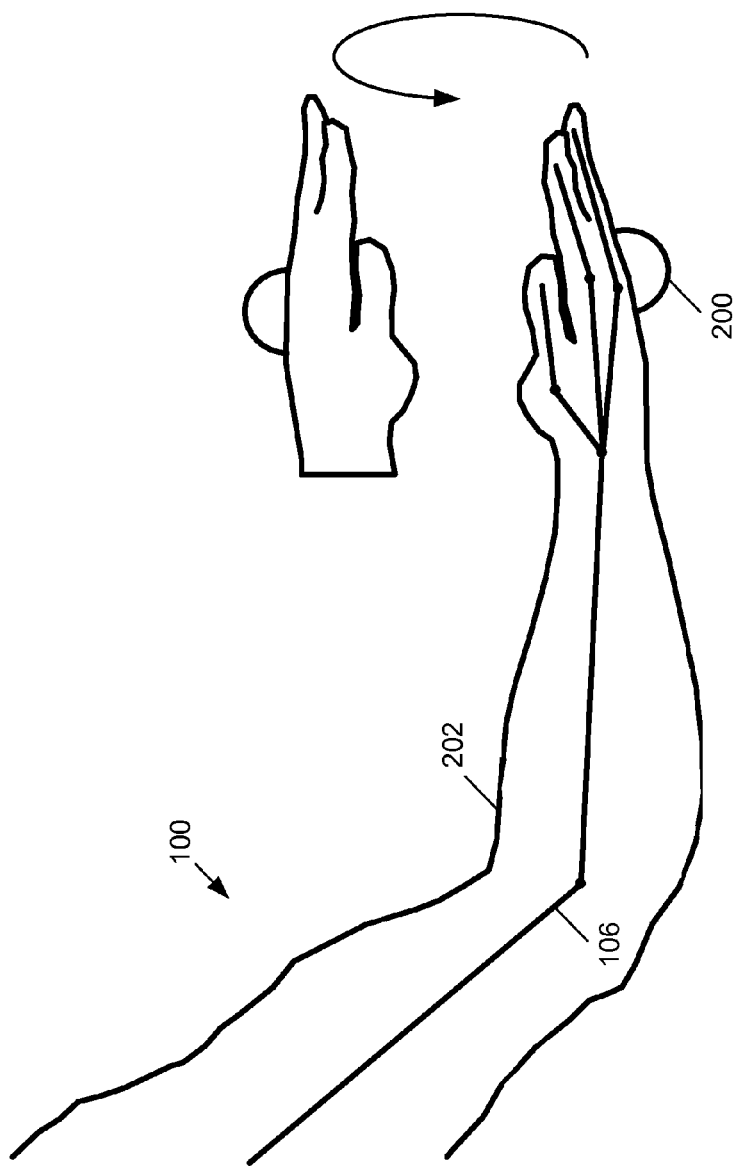

Referring to FIG. 2, by attaching additional features prior to skinning, a skeleton and the additional features may be skinned together, thereby allowing the movement of the skeleton to influence deformations in both the character's skin and the additional features. To attach a feature after skinning (i.e., a post-skinning feature), the feature is typically created to account for skin deformations that appear during skinning of the skeleton. Correspondingly, to attach a feature prior to skinning (i.e., a pre-skinning feature), the feature is created that is substantially free from the influences of skin deformations due to skinning the skeleton. In this illustration, a lump 200 is produced to have a shape that represents the lump prior to skinning the skeleton 106 and the lump. By skinning the skeleton 106 and the lump 200, a mesh 202 is formed that includes the shape of the lump along with the shape of the arm. Furthermore, the mesh 202 (including the shape of the lump) may be deformed based upon the movement of the skeleton 106. For example, the wrist of the animated arm may be rotated such that the palm of the hand is rotated from pointing upward to pointing downward. Since the skeleton and the lump were associated prior to skinning, as the wrist bones and joints rotate, the lump also rotates and remains substantially fixed to the back of the hand. Thus, rather than producing a concavity 110 (shown in FIG. 1), the lump 200 rotates and retains its orientation relative to the hand.

One or more techniques and methodologies may be implemented to determine the shape of a pre-skinning feature (such as the lump 200). For example, an inversion technique may be used to determine the pre-skinned shape of a feature (referred to as the preShape). Such a computation may use information such as the position of the skeleton during skinning (i.e., the bind pose), the position of the skeleton after a movement has been applied (referred to as the current pose), and shape of the skinned feature (referred to as the postShape). Both the preShape and the postShape may include a set of offsets such as geometric offsets (referred to as a blendshape) that can be added to a mesh to animate a geometric feature. For example, a muscle blendshape may be considered the geometric difference between the geometry of the muscle fully contracted and the rest geometry. A numerical weight may be used to control the influence of a blendshape upon a geometry. For example, a muscle blendshape associated with a weight of one represents that the muscle is fully contracted, whereas a weight of zero produces a geometry in which the muscle is at a rest position. In applications in which the inverting geometric features are of interest, blendshape weight values of one may be used. As such, the current pose may be expressed as:

CurrentPose=$Env$(BindPose+preShape) (1)

where $Env(\ )$ represents an exemplary skinning function. As such, equation (1) may also be re-written to be expressed as:

CurrentPose=$Env$(BindPose)+postShape (2)

Equating equations (1) and (2):

$Env$(BindPose+preShape)=$Env$(BindPose)+postShape (3)

From equation (3), the preShape may be determined by inverting the skinning function such that:

preShape $Env^{-1}$($Env$(BindPose)+postShape) BindPose (4)

Thus, the shape of the feature prior to skinning may be determined from the inverse skinning equation (4). In some arrangements, skinning may be provided by one or more linear skinning functions, non-linear skinning functions or a combination of linear or non-linear skinning functions. For example, a skinning function that includes a combination of a linear skinning function and a non-linear skinning function may be expressed as:

$$Env(p) = \sum_i w_i J_i p + NLEnv(p) \qquad (5)$$

where $J_i=(R_i|t_i)$ is a rigid transformation that includes a rotation component $R_i$ and a translation component $t_i$, and $w_i$ is a scalar weight. NLEnv( ) represents the non-linear portion of the skinning function Env( ) and p represents a vertex to be skinned.

In a scenario in which the vertex p is skinned with only the linear portion of the skinning equation (5) (i.e., NLEnv(p)=0), the skinning function may be inverted and expressed as:

$$Env(p) = \sum_i w_i J_i p = \sum_i w_i (R_i | t_i) p = \sum_i w_i R_i p + \sum_i w_i t_i \qquad (6)$$

Inverting equation (6) to solve for p may be expressed as:

$$p = \left(\sum_i w_i R_i\right)^{-1} \left(Env(p) - \sum_i w_i t_i\right) \qquad (7)$$

Thus, the linear portion of the skinning function may be inverted as provided by equation (7) for each vertex p.

One or more inversions techniques may be implemented to solve the non-linear portion of the skinning function represented in equation (5). For example, an iterative approach based on the Newton-Raphson method or other root-identifying technique may be implemented. Generally, such iterative techniques start with an initial value and converge at a solution over a number of executed iterations. To determine an initial value, one or more techniques may be implemented such as using the linear solution provided by equation (7). Along with identifying an initial value from information associated with a single vertex, as provided by equation (7), information from other vertices may also be incorporated into the initial value determination. For example, spatial coherency among vertices may be used to determine an initial value based upon values computed from neighboring vertices. In one arrangement, the Newton-Raphson method may be used in which $p^r_k$ may be considered an estimate of $p^r$ after k iterations of the method. Such an iterative approach may be expressed as:

$p_{k+1}^r = p_k^r - \nabla Env(p_k^r)^{-1} Env(p_k^r)$ (8)

Using equation (7), a linear solution may be expressed as:

$$p_{-1}^k = \left(\sum_i w_i R_i\right)^{-1} \left(Env(p^r) - \sum_i w_i l_i\right) \qquad (9)$$

Using the solved values from neighboring vertices:

$$p_0^r = p_{-1}^r + \text{interpolation}_{p^n \in CN(p^r)}(\{p^n - p_{-1}^n\}) \qquad (10)$$

where $p'' - p''_{-1}$ is the difference between the initial linear estimate and the final estimate and $CN(p^r)$ is the set of computed neighbor vertices for $p^r$.

In some arrangements, the neighboring vertices selected for use in the computations may be restricted, for example, computations for each vertex may be restricted to use the nearest neighboring vertices. Additionally an interpolation scheme based upon normalized distance may be implemented. As such a vertex may be expressed as:

$$p_0^r = p_{-1}^r + \sum_{p^n} \frac{w_{p^n}}{\sum_{p^n} w_{p^n}} (p^n - p_{-1}^n) \qquad (11)$$

Where $w_p^n$ are weighting factors that may be expressed as:

$$w_{p^n} = \frac{1}{\|Env(p^r) - Env(p^n)\| + \varepsilon} \qquad (12)$$

Additional techniques and methodologies may also be implemented to select an initial vertex for computing the preShape value. For example a vertex that has a relatively large number of neighboring vertices may be selected so that a large amount of information (associated with the many neighboring vertices) may be used to compute the position of the vertex. Selection may also be based upon location of the vertices on the feature. For example, vertices may be first selected that are located at a boundary of a feature. Vertices may next be selected in a progressive manner toward the center or near-center of the feature such that the selections appear to occur in a "brushfire" fashion. Other types of selection patterns may also be used to compute the preShape of a feature.

Figure 3:
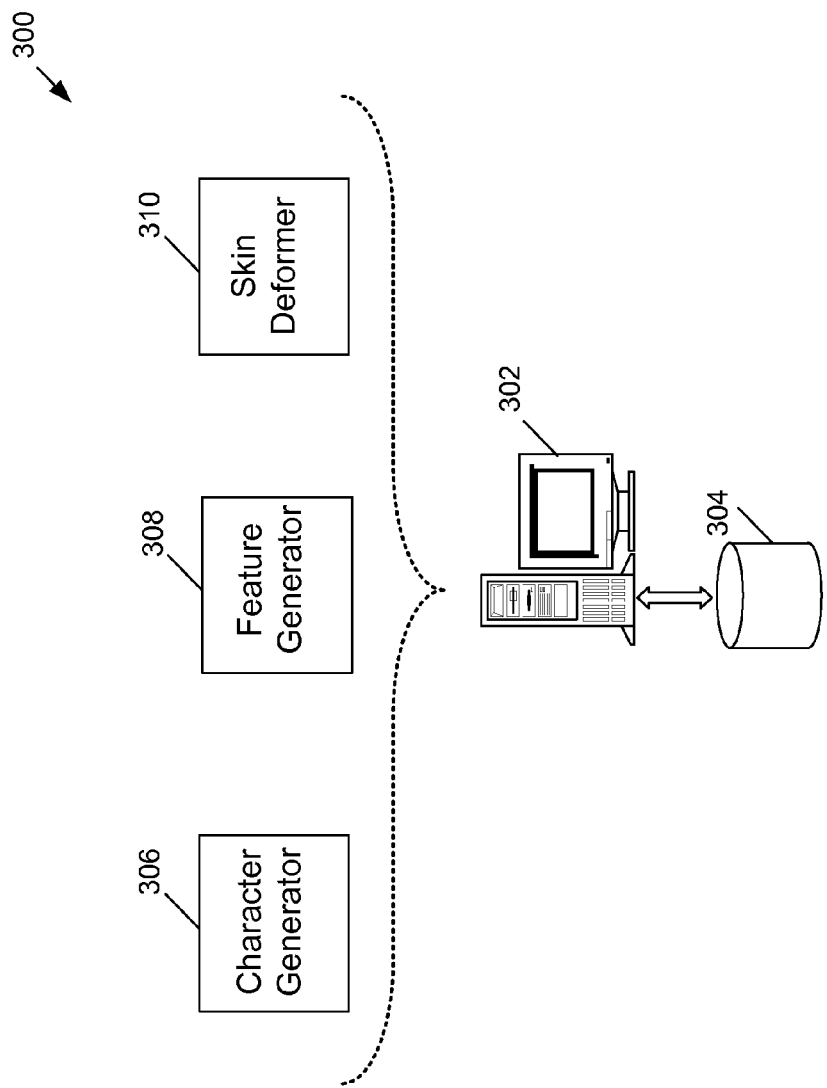
FIG. 3 is a diagram of a character animation system.

Referring to FIG. 3, a character animation system 300 includes a computer system 302 (or other type of computing device) for generating animated characters that include one or more features (e.g., horn, lumps, appendages, facial blemishes, etc.). The computer system 302 is capable of combining portions of a generated character (e.g., a skeleton) and one or more generated features prior to skinning the character. Along with components (e.g., interface cards, etc.) for receiving data (e.g., a character model) from various sources (e.g., a library of character models, the Internet, other computer systems, etc.), the computer system 302 also includes memory (not shown) and one or more processors (also not shown) to execute processing operations. A storage device 304 (e.g., a hard drive, a CD-ROM, a Redundant Array of Independent Disks (RAID) drive, etc.) is in communication with the computer system 302 and is capable of storing and retrieving data associated with character generation (e.g., character skeletons, representations of character features) along with other types of data (e.g., data representing motion to animate a character).

In this arrangement, to generate the characters, a character generator 306 is executed by the computer system 302. Various type of character representations may be generated by the character generator 306. For example, representation of skeletons may be generated that substantially correlate to human skeletons (e.g., represent articulated joints and bones). In some arrangements, skeletons may be composed of nodes positioned in three-dimensional space to represent skeleton joints and bones. By grouping the nodes the skeleton may be produced and the nodes may be transformed to define rotations and translations of the skeleton joints and bones.

To generate features such as horns, lumps or other types of deformations, a feature generator 308 is also executed by the computer system 302. Various types of techniques and methodologies may be implemented for shape generation. For example, automated software packages (e.g., drawing and painting packages, CAD packages, photograph editing packages, etc.) may be used along with user input (e.g., hand drawings produced by a graphic artist) to produce feature shapes that may be skinned with a character skeleton or a portion of a skeleton.

To skin the generated characters and features, a skin deformer 310 is executed by the computer system 302. To skin, the skin deformer 310 may implement one or more skinning techniques. For example, a portion of the inversion technique described above may be incorporated into the skin deformer 310. Along with skinning, the skin deformer 310 may also combine the generated character skeleton and features prior to skinning the character. However, in some arrangements, combining features and characters may be provided by another process executed by the computer system 302 such as the feature generator 308 or another separately dedicated process.

Figure 4:
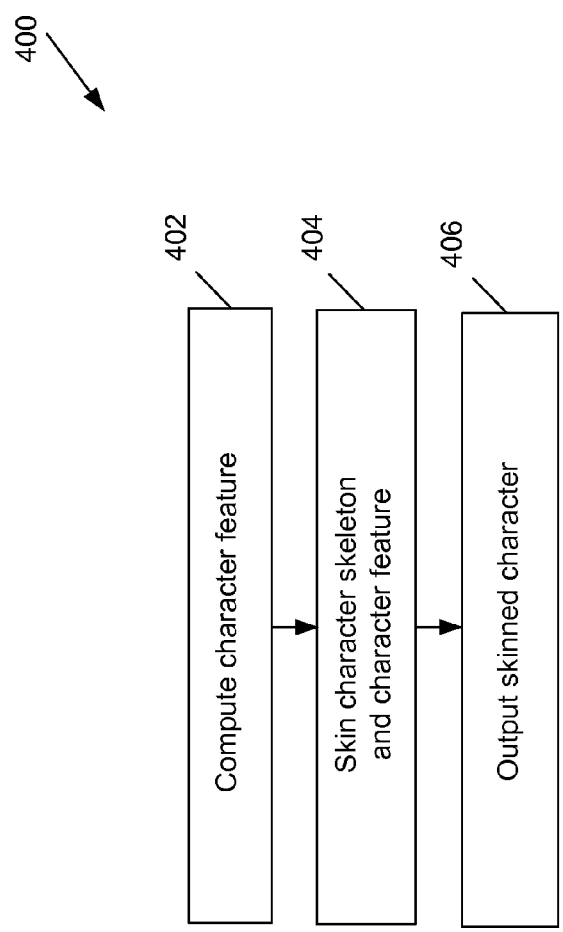
FIGS. 4 and 5 are flowcharts of a skin deformer.
Like reference symbols in the various drawings indicate like elements.

Referring to FIG. 4, a flowchart 400 represents some of the operations of the skin deformer 310. The operations may be executed by a single computer system (e.g., computer system 302) or multiple computing devices. Along with being executed at a single site (e.g., at one computer system), operation execution may be distributed among two or more sites.

Operations include computing a character feature 402, for example, from a representation of character skeleton in a reference position (e.g., the bind pose), a representation of the skeleton moved into another position (e.g., the current pose) and the shape of the feature after skinned (e.g., the post-Shape). Inversion techniques, such as linear and non-linear skinning inversion techniques may be implemented to compute the character feature.

Operations also include skinning 404 the computed character feature and the character skeleton. Various types of skinning functions may be used individually or in combination to compute the skin of the character feature and the character skeleton. Upon skinning the character, operations may include outputting 406 the skinned character. For example, the character may be output for display on a computer monitor or other type of viewing device. The skinned character may also be output for producing a hardcopy of the character on a printing device or stored in a storage unit such as storage device 304.

To perform the operations described in flow chart 400, the skin deformer 310 may perform any of the computer-implement methods described previously, according to one implementation. For example, a computer system such as computer system 302 (shown in FIG. 3) may execute the skin deformer 310. The computer system may include a processor (not shown), a memory (not shown), a storage device (e.g., storage device 304), and an input/output device (not shown). Each of the components may be interconnected using a system bus or other similar structure. The processor is capable of processing instructions for execution within the computer system. In one implementation, the processor is a single-threaded processor. In another implementation, the processor is a multi-threaded processor. The processor is capable of processing instructions stored in the memory or on the storage device to display graphical information for a user interface on the input/output device.

Figure 5:
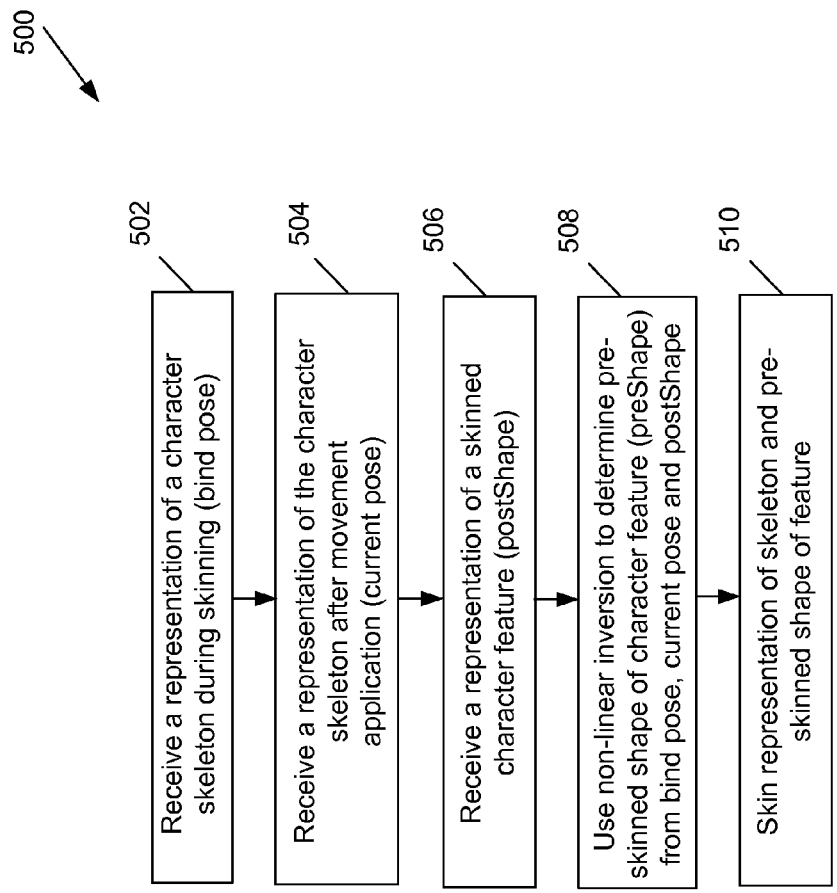

Referring to FIG. 5, a flowchart 500 represents one particular arrangement of operations of the skin deformer 310 for computing the preShape of a character feature. Operations include receiving 502 a representation of a character skeleton in a reference position (e.g., a bind pose), receiving 504 a representation of the character skeleton after movement has been applied (e.g., a current pose) and receiving 506 a representation of a skinned character feature (e.g., a postShape).

Operations also include using 508 non-linear inversion to determine a pre-skinned shape of the character feature (e.g., a preShape) from the bind pose, the current pose and the post-Shape. (or other root-identifying technique) may be implemented for solving the inverse skinning equation (4). As mentioned above, a linear inversion technique, for example as provided by equation (7), may be used to provide an initial value from which to begin the iterative technique. Upon attaining the pre-skinned shape of the character feature, operations may include skinning 510 a representation of the character skeleton and the pre-skinned shape of the character feature.

To perform the operations described in flow charts 400 and 500, the skin deformer 310 may perform any of the computer-implement methods described previously, according to one implementation. For example, a computer system such as computer system 302 (shown in FIG. 3) may execute the skin deformer 310. The computer system may include a processor (not shown), a memory (not shown), a storage device (e.g., storage device 304), and an input/output device (not shown). Each of the components may be interconnected using a system bus or other similar structure. The processor is capable of processing instructions for execution within the computer system. In one implementation, the processor is a single-threaded processor. In another implementation, the processor is a multi-threaded processor. The processor is capable of processing instructions stored in the memory or on the storage device to display graphical information for a user interface on the input/output device.)

The memory stores information within the computer system. In one implementation, the memory is a computer-readable medium. In one implementation, the memory is a volatile memory unit. In another implementation, the memory is a non-volatile memory unit.

The storage device is capable of providing mass storage for the computer system. In one implementation, the storage device is a computer-readable medium. In various different implementations, the storage device may be a floppy disk device, a hard disk device, an optical disk device, or a tape device.

The input/output device provides input/output operations for the computer system. In one implementation, the input/output device includes a keyboard and/or pointing device. In another implementation, the input/output device includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the following claims.

What is claimed is:

1. A computer-implemented method comprising:
    identifying, by a processor, a representation of a feature of an animated character by inverting a skinned representation of the feature in a first position and subtracting a representation of the feature in the first position from the inverted skinned representation of the feature in the first position, wherein the inversion includes a non-linear inversion of the skinned representation of the feature; and skinning the identified feature representation to produce the animated character in a second position.

2. The computer-implemented method of claim 1, wherein a portion of the animated character is skinned with the identified feature.

3. The computer-implemented method of claim 1, wherein inverting the skinned representation includes inverting a portion of the animated character in the second position.

4. The computer-implemented method of claim 1, wherein a linear inversion of the skinned representation of the feature is used to initiate the non-linear inversion of the skinned representation of the feature.

5. The computer-implemented method of claim 1, wherein the non-linear inversions implements an iterative technique.

6. The computer-implemented method of claim 1, wherein the non-linear inversion implements the Newton-Raphson method.

7. The computer-implemented method of claim 1, wherein inverting the skinned representation of the feature includes selecting a vertex of the feature representation.

8. The computer-implemented method of claim 1, wherein inverting the skinned representation of the feature includes selecting a vertex of the feature representation based upon neighboring vertices.

9. The computer-implemented method of claim 1, wherein inverting the skinned representation of the feature includes selecting a first vertex located at a boundary of the feature representation.

10. The computer-implemented method of claim 9, wherein inverting the skinned representation of the feature includes selecting a second vertex located between the first vertex and a center location of the feature representation.

11. A system comprising:
a computing device comprising:
a memory configured to store instructions; and
a processor to execute instructions to perform operations comprising:
identifying a representation of a feature of an animated character by inverting a skinned representation of the feature in a first position and subtracting a representation of the feature in the first position from the inverted skinned representation of the feature in the first position, wherein the inversion includes a non-linear inversion of the skinned representation of the feature, and skinning the identified feature representation to produce the animated character in a second position.

12. The system of claim 11, wherein a portion of the animated character is skinned with the identified feature.

13. The system of claim 11, wherein inverting the skinned representation includes inverting a portion of the animated character in the second position.

14. The system of claim 11, wherein inverting the skinned representation of the feature includes selecting a vertex of the feature representation.

15. The system of claim 11, wherein inverting the skinned representation of the feature includes selecting a first vertex located at a boundary of the feature representation.

16. A computer program product tangibly embodied in storage device and comprising instructions that when executed by a processor perform a method comprising:
identifying a representation of a feature of an animated character by inverting a skinned representation of the feature in a first position and subtracting a representation of the feature in the first position from the inverted skinned representation of the feature in the first position, wherein the inversion includes a non-linear inversion of the skinned representation of the feature; and
skinning the identified feature representation to produce the animated character in a second position.

17. The computer program product of claim 16, wherein a portion of the animated character is skinned with the identified feature.

18. The computer program product of claim 16, wherein inverting the skinned representation includes inverting a portion of the animated character in the second position.

19. The computer program product of claim 16, wherein inverting the skinned representation of the feature includes selecting a vertex of the feature representation.

20. The computer program product of claim 16, wherein inverting the skinned representation of the feature includes selecting a first vertex located at a boundary of the feature representation.

* * * * *

UNITED STATES PATENT AND TRADEMARK OFFICE
CERTIFICATE OF CORRECTION

PATENT NO. : 8,405,664 B1  
APPLICATION NO. : 13/279595  
DATED : March 26, 2013  
INVENTOR(S) : Frederic P. Pighin and Cary Phillips Page 1 of 1

It is certified that error appears in the above-identified patent and that said Letters Patent is hereby corrected as shown below:

In the Specifications Section,

Column 7, line 16, delete
"(or other root-identifying technique) may be implemented for solving the inverse skinning equation (4)."

and insert
--For example, as mentioned above, an interactive approach based on the Newton-Raphson method (or other root-identifying technique) may be implemented for solving the inverse skinning equation (4).--

Image 4, column 4, delete
"preShape = Env-1(Env(BindPose) + postShape)   BindPose"

and insert
--preShape = Env-1(Env(BindPose) + postShape) - BindPose--

Signed and Sealed this
Sixth Day of August, 2013

Teresa Stanek Rea
*Acting Director of the United States Patent and Trademark Office*